(12) United States Patent
Stangeland et al.

(10) Patent No.: US 7,144,049 B2
(45) Date of Patent: Dec. 5, 2006

(54) SPHERICAL FLANGE ASSEMBLY

(75) Inventors: Maynard Stangeland, Thousand Oaks, CA (US); Ronald Urquidi, Van Nuys, CA (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/838,282

(22) Filed: May 4, 2004

(65) Prior Publication Data

US 2005/0248155 A1    Nov. 10, 2005

(51) Int. Cl.
*F16L 19/00*    (2006.01)

(52) U.S. Cl. ...................... 285/368; 285/261
(58) Field of Classification Search ........... 285/368, 285/261
See application file for complete search history.

(56) References Cited

U.S. PATENT DOCUMENTS

| | | | | |
|---|---|---|---|---|
| 3,477,748 A | * | 11/1969 | Tinsley | 285/267 |
| 4,180,285 A | * | 12/1979 | Reneau | 285/261 |
| 4,195,865 A | * | 4/1980 | Martin | 285/263 |
| 4,448,449 A | | 5/1984 | Halling et al. | |
| 4,772,033 A | | 9/1988 | Nash | |
| 4,840,409 A | * | 6/1989 | Welkey | 285/261 |
| 5,368,342 A | * | 11/1994 | Latham et al. | 285/261 |
| 5,697,651 A | | 12/1997 | Fernandes | |

* cited by examiner

*Primary Examiner*—David Bochna
(74) *Attorney, Agent, or Firm*—Neal, Gerber & Eisenberg LLP

(57) ABSTRACT

A spherical flange assembly is disclosed. The spherical flange assembly comprises a seat member, a heel member, a seal gland and at least one nut and bold assembly. The seat member includes a concave portion. The heel member includes a convex portion and a seal gland opening. The seal gland is disposed within the seal gland opening.

1 Claim, 5 Drawing Sheets

SPHERICAL FLANGE ASSEMBLY

FIELD OF THE INVENTION

The present invention is directed to spherical flange assemblies and, in particular, to spherical flange assemblies that allow for angular misalignment without resulting in either large duct loads or joint leakage.

BACKGROUND OF THE INVENTION

Currently, aircraft designers and manufacturers use various flexible, joints throughout the manufacture of the jet engines for use in the aircraft. To this end, various attempts to develop a satisfactory flexible, moderately pressurized joint have been made.

For example, U.S. Pat. No. 4,448,449, issued to Halling, et al. and entitled "Flexible Piping Joint and Method of Forming Same" (Halling), discloses a fluid-tight coupling and sealing apparatus. Hailing describes a flexible piping joint, for use in fluid systems at moderate pressures and temperatures, that require a limited amount of angulation during operation. The invention in Halling, however, employs structurally inefficient load paths and non-metallic sealing elements. Further, these elements are not feasible at the extreme temperatures and pressures of rocket engine applications. Moreover, the sealing interface depends on the interference fit between the non-metallic seal and the metal duct material, both of which have significantly different thermal coefficients of expansion which limit the allowable operating temperature range. Additionally, the spherical interface must react with the pressure-separating load with the hoop strength of the concentric rings through a very structurally inefficient contact angle. Thus, for high pressure applications, the ring thicknesses would be significant, resulting in a very heavy structure, much larger in diameter for a given duct diameter.

U.S. Pat. No. 4,772,033, issued to Nash and entitled "Flexible Duct Joint Utilizing Lip in Recess in a Flange" (Nash), discloses a flexural joint for connecting opposing ends of two annular ducts. The invention in Nash is directed towards large diameter thin wall jet engine casing joints that permit both torsional and transverse motion. The spherical interface possesses a much larger diameter than the casing diameter, with the retaining bolt pattern possessing an even larger diameter. However, this type of structurally inefficient interface is also only acceptable for low-pressure applications that do not have to react large separating loads. For example, in high-pressure applications, the interface seal must be positioned close to the duct internal diameter to minimize the pressure separating load. Additionally, the interface bolts must be preloaded at a stiffness level sufficient to preclude separation at the seal interface with the high operating pressures. Thus, the teachings of Nash are not applicable or structurally feasible for high-pressure applications.

Finally, U.S. Pat. No. 5,697,651, issued to Fernandes and entitled "Flexible Duct Joint Having a Low Leakage, Pressure-Balanced Bellows Seal" (Fernandes), discloses a flexible joint for sealing two conduits. Fernandes discloses a flexible duct joint for aircraft engines possessing compressed air ducting joints that operate at relatively low pressures, as compared to rocket engine joints. The joint concept permits angulation motion during operation with limited leakage which is acceptable in the compressed air system. However, Fernandes utilizes joint structural shapes, retention mechanisms and multi-convolution bellows that are not feasible for rocket engine high pressure cryogenic and hot gas systems that require zero leakage.

Although the aforementioned references do provide flexible joints to overcome jet engine operating conditions, the references nevertheless fail, in one form or another, to facilitate the much more extreme conditions that exist in a rocket engine. This is primarily due to the fact that the aforementioned references are typically conceived for applications with operating pressures less than 1000 pounds per square inch (psi). The references are, generally speaking, not structurally efficient or feasible enough for applications within the 8000 psi range.

Since the early development of liquid-fuel rocket engines, the need to transfer propellants from low pressure supply tanks to turbopumps, turbine-driven pumps that raise the propellants used therein to pressures high enough for injection into a combustion chamber, has required specialized ducting that can, inter alia, accommodate assembly misalignments, thermal induced defections and both pressure- and vibration-induced loads. Early rocket engines typically operated at combustion chamber pressures of less than 1,000 pounds per square inch (psi), which required pump discharge pressures of less than 2,000 psi. For these applications, ducting, including tied bellows and braided hoses adapted from the aircraft engine and petro-chemical industries, were utilized to accommodate the aforementioned misalignment and deflections.

However, as combustion chamber pressures were increased from less than 1,000 psi to greater than 3,000 psi and closed cycle engines were introduced, a need for propellant ducts operating at up to 8,000 psi at temperatures as low as $-400°$ F. and hot gas ducts operating at up to 6,000 psi at temperatures as high as $1,200°$ F. were established. The use of tied bellows or braided hoses are not feasible at these operating conditions, so solid wall ducts possessing sufficient length and routing, and flexible enough to accommodate the deflections were utilized. The excessive weight of the complex ducting created the need for flange joints that could accommodate assembly misalignments and react to the pressure- and vibration-induced loads without leakage at the extreme operating conditions.

SUMMARY OF THE INVENTION

The present invention discloses a spherical flange assembly for overcoming the above-stated disadvantages, while also accommodating the preferred operating conditions listed herein. A spherical flange interface, such as that disclosed below, preferably allows for a significant amount of angular misalignment. Incorporating the spherical flange apparatus at both ends of a duct accommodates both angular and offset misalignment. This results in an easier assembly of engine components and lower resultant loads which, in turn, makes for a more reliable joint due to better sealing conditions at the spherical flange interface. Additionally, the spherical flange of the present invention accommodates the misalignment of high pressure ducts, thereby reducing misalignment loads, decreasing engine weight and facilitating assembly.

Misalignment of adjacent surfaces is allowed by providing a shape that permits joining the adjacent surfaces. More specifically, a spherical, convex surface is machined in the heel portion of one flange, protruding from the structural surface. Into this heel portion, a seal groove is machined that will receive a seal, either a packing or a pressure-assisted seal. The pressure-assisted seal can have an uneven leg shape that can pick up the spherical surface shape, or it can be made of differing glands. A matching spherical, concave surface is machined into the mating interface flange, also known as the seat portion. Sufficient clearance is left between the flange portions when the spherical interfaces are engaged to allow them to rotate for the predetermined angular misalignment. Bolts are then set in holes corresponding to the size of the clearance between the flange portions, with spherical washer sets under the bolt head and nut, thus providing bolt alignment consistent with the flange motion. The bolts are disposed on the apparatus in a uniform manner. This process precludes separation at the seat-to-heel interface when pressure and other operating loads are applied.

To this end, a spherical flange assembly is disclosed. The spherical flange assembly comprises a seat member, a heel member, a seal gland and at least one nut and bolt assembly. The seat member includes a concave portion. The heel member includes a convex portion and a seal gland opening. The seal gland is disposed within the seal gland opening.

A better understanding of the objects, advantages, features, properties and relationships of the present invention will be obtained from the following detailed description and accompanying drawings, which set forth an illustrative embodiment and which are indicative of the various ways in which the principles of the present invention may be employed.

BRIEF DESCRIPTION OF THE DRAWINGS

For a better understanding of the invention, reference may be had to various embodiments, as shown in the following drawings, in which.

DETAILED DESCRIPTION OF THE PRESENTLY-PREFERRED EMBODIMENTS

Due to the inherent tolerance variability of hardware, flange misalignments can occur during the installation of mating components for a liquid-propellant rocket engine. Further, these flange misalignments can include axial, lateral and/or angular offsets. If these misalignments are high, they can import significant loads into the two mating components, which can lead to failure. To address this flange misalignment issue, a spherical flange assembly was developed that allows for misalignment yet reduces imparted loads, while at the same time provides sufficient sealing against leakage. The design of the present invention was tested to evaluate and compare performance parameters, such as, for example, misalignment and leakage. During the testing, the environmental conditions ranged from −100 to +400 degrees Fahrenheit (° F.), with 1000 to 6000 pounds per square inch (psi) pressure being applied to the spherical flange assembly.

Figure 1:
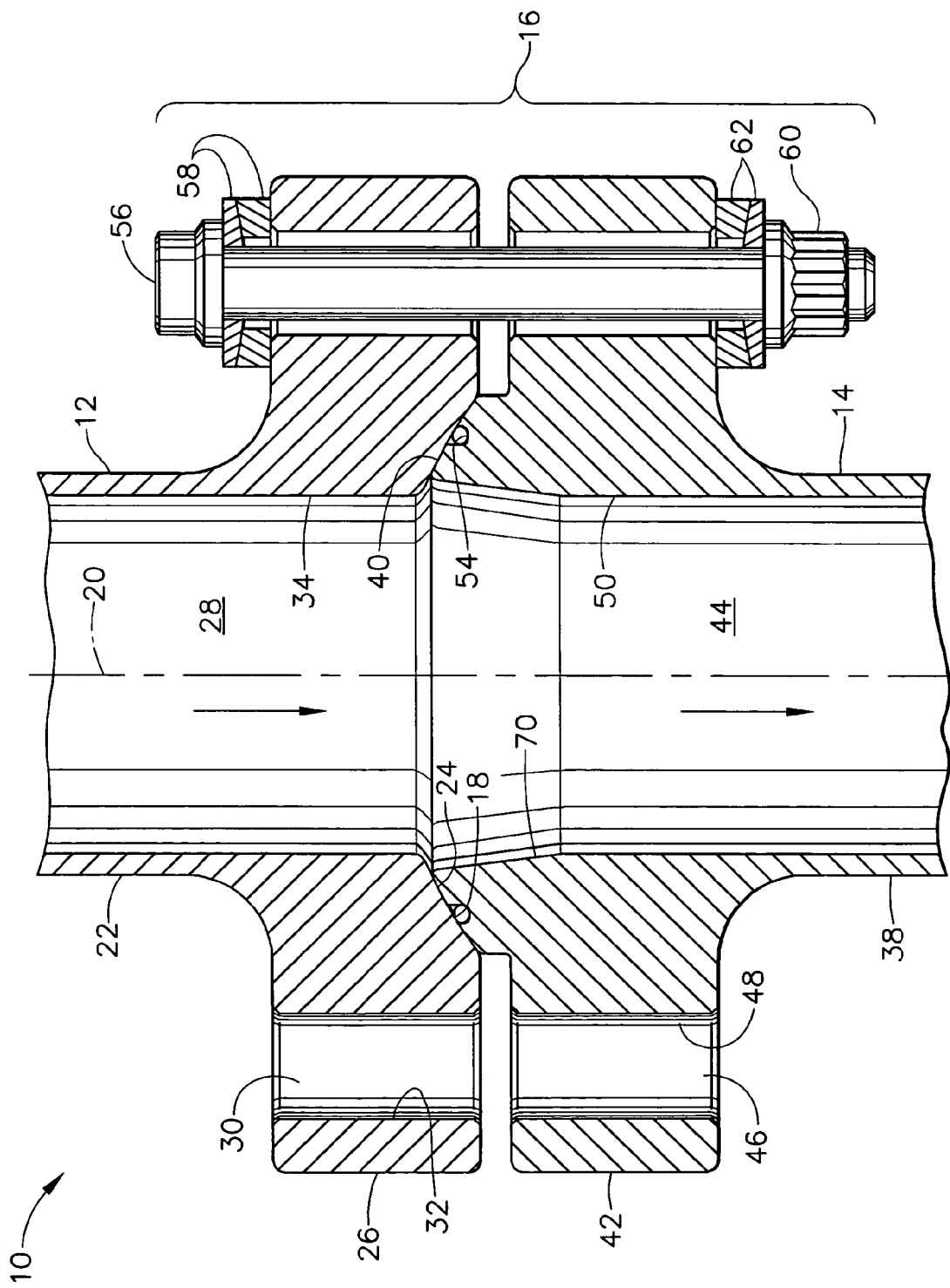
FIG. 1 illustrates a cross-sectional view of a spherical flange interface assembly, manufactured in accordance with the present invention.

Referring to the Figures, and in particular FIG. 1, which illustrates one embodiment of the present invention, spherical flange assembly 10 is illustrated in cross-sectional form. As illustrated in FIG. 1, spherical flange assembly 10 comprises, generally, seat member 12, heel member 14, bolt assembly 16 and seal gland 18. It is to be understood that both seat member 12 and heel member 14 can extend away from the interface region, shown in FIG. 1, for any preferred distances.

As can be understood from FIGS. 1–4, seat member 12 is preferably spherical in cross-sectional shape; that is, seat member 12 preferably is disposed uniformly and circumferentially about axis 20. Additionally, seat member 12 includes a concave portion; this portion will be described in greater detail below. Preferably, seat member 12 also possesses seat member duct radius, $R_{SD}$, and seat member spherical radius, $R_{SS}$. Seat member duct radius, $R_{SD}$, corresponds to the radius of the inside of seat member 12, as described more fully below.

In a preferred embodiment, seat member 12 is made of Inconel 718™, which is a high-strength nickel-based alloy capable of containing the operating pressure and loads at the temperature extremes experienced by spherical flange assembly 10. However, it is nevertheless contemplated that seat member 12 may be made of any ducting material, such as, for example, aluminum alloys, stainless steels, nickel base alloys, high strength superalloys, titanium alloys or any composite thereof, depending on the application pressure and temperature.

Seat member 12 itself is divided into three portions: seat duct portion 22, concave seat interface portion 24 and seat flange connection portion 26. Seat duct portion 22 contains channel 28. It is through channel 28 that gas or liquid flows from seat member 12 to heel member 14; that is, in a direction such that no forward step protrudes into the flowstream when misaligned (as referenced by the arrow extending from Ref. No. 28). Concave seat interface portion 24 is the portion of seat member 12 which comes into contact with the corresponding interface portion from heel member 14. Finally, seat flange connection portion 26 allows seat member 12 to be conjoined with heel member 14, through the use of nut and bolt assembly 16.

To facilitate the joining of seat member 12 with heel member 14, disposed within seat flange connection portion 26 of seat member 12 are a plurality of openings 30. Preferably, each of the plurality of openings 30 are bored, drilled or otherwise cut through seat connection portion 24 of seat member 12. Further, each of the plurality of openings 30 are aligned, in both number and spacing, with a plurality of openings 46 in the heel flange connect portion 42 of heel member 14.

As illustrated by FIGS. 1–4, channel 28 is defined by inside surface 34. Inside surface 34 of channel 28, as shown, also is disposed uniformly about axis 20. Thus, consequently, inside surface 34 of channel 28 represents a constant flow area of seat duct portion 22 of seat member 12.

Like seat member 12, heel member 14 is preferably also spherical in cross-sectional shape, also being disposed uniformly and circumferentially about axis 20, the same axis about which seat member 12 is disposed. Preferably, heel member 14 also possess heel member spherical radius, $R_{HS}$. Heel member spherical radius, $R_{HS}$, which corresponds to the radius of the conveyance of heel member 14, is preferably approximately 1.5 to 2.5 times heel member duct radius, $R_{HD}$, which corresponds to the radius of the inside heel member 12, as described more fully below. This ratio between heel member spherical radius, $R_{HS}$, and heel member duct radius, $R_{HD}$, of heel member 14 serves to preferably accomplish approximately a 45° nesting interface of heel member 14 into seat member 12. Alternatively, heel member 14 may comprise any other spherical radius-shaped device that can nevertheless realize the objects of the present invention.

It should be noted that axis 20 is common to both seat member 12 and heel member 14. Further, seat member duct radius, $R_{SD}$, heel member duct radius, $R_{HD}$, seat member spherical radius, $R_{SS}$ and heel member spherical radius, $R_{HS}$, are all based from points located along axis 20. As a result, in some instances, seat member duct radius, $R_{SD}$, and heel member duct radius $R_{HD}$, preferably comprise equal values. It should also be noted that heel member spherical radius, $R_{HS}$, and seat member spherical radius, $R_{SS}$, preferably comprise the same length. This is because the curvature of heel member 14 is equal to the curvature of seat member 12.

In a preferred embodiment, heel member 14 is also made of Inconel 718™, which is a high-strength nickel-based alloy capable of containing the operating pressure and loads at the temperature extremes experienced by spherical flange assembly 10. However, it is nevertheless contemplated that heel member 14 may be made of any ducting material, such as, for example, aluminum alloys, stainless steels, nickel base alloys, high strength superalloys, titanium alloys or any composite thereof, depending on the application pressure and temperature.

Also similar to seat member 12, heel member 14 itself is also divided into three portions: heel duct portion 38, convex heel interface portion 40 and heel flange connection portion 42. Heel duct portion 38 contains channel 44. Like channel 28, it is through channel 44 that gas or liquid is permitted to pass from seat member 12 to heel member 14 (again, refer to the direction of the arrow extending from Ref. No. 44). Convex heel interface portion 40 is the portion of heel member 14 which comes in contact, through, preferably, nesting, with the corresponding portion from seat member 12. Finally, heel flange connection portion 42 allows heel member 14 to be conjoined with seat member 12, through the use of nut and bolt assembly 16.

To facilitate the joining of seat member 12 with heel member 14, disposed within heel flange connection portion 42 of heel member 14 are a plurality of openings 46. Preferably, each of the plurality of openings 46 are bored, drilled or otherwise cut through heel connection portion 42 of heel member 14. Further, each of the plurality of openings 46 are aligned, in both number and spacing, with the plurality of openings 30 in the seat flange connect portion 26 of seat member 12.

As illustrated by FIGS. 1–4, channel 44 is defined by inside surface 50. Inside surface 50 of channel 44, as shown, also is disposed uniformly about axis 20. Thus, consequently, inside surface 50 of channel 44 is preferably a constant flow area of heel duct portion 38 of heel member 14.

As channel 44 approaches convex heel interface portion 40, inside surface 50 of channel 44 is beveled outward, as shown by reference numeral 70. The purpose for the beveling 70 of inside surface 50 of channel 44 is selected to preclude a forward facing step from protruding into the flow stream with the maximum prescribed angular misalignment.

Additionally disposed within heel member 14 is seal gland opening 54. As illustrated in FIGS. 1–4, seal gland opening 54 is disposed within first heel interface portion 40 of heel member 14. Seal gland opening 54 is preferably configured to receive seal gland 18. Seal gland 18 is preferably used to provide a zero leakage seal between seat member 12 and heel member 14. Preferably, seal gland 18 may comprise an o-ring for room temperature application or a metal pressure actuated seal with appropriate coating for cryogenic or hot gas applications.

Figure 2:
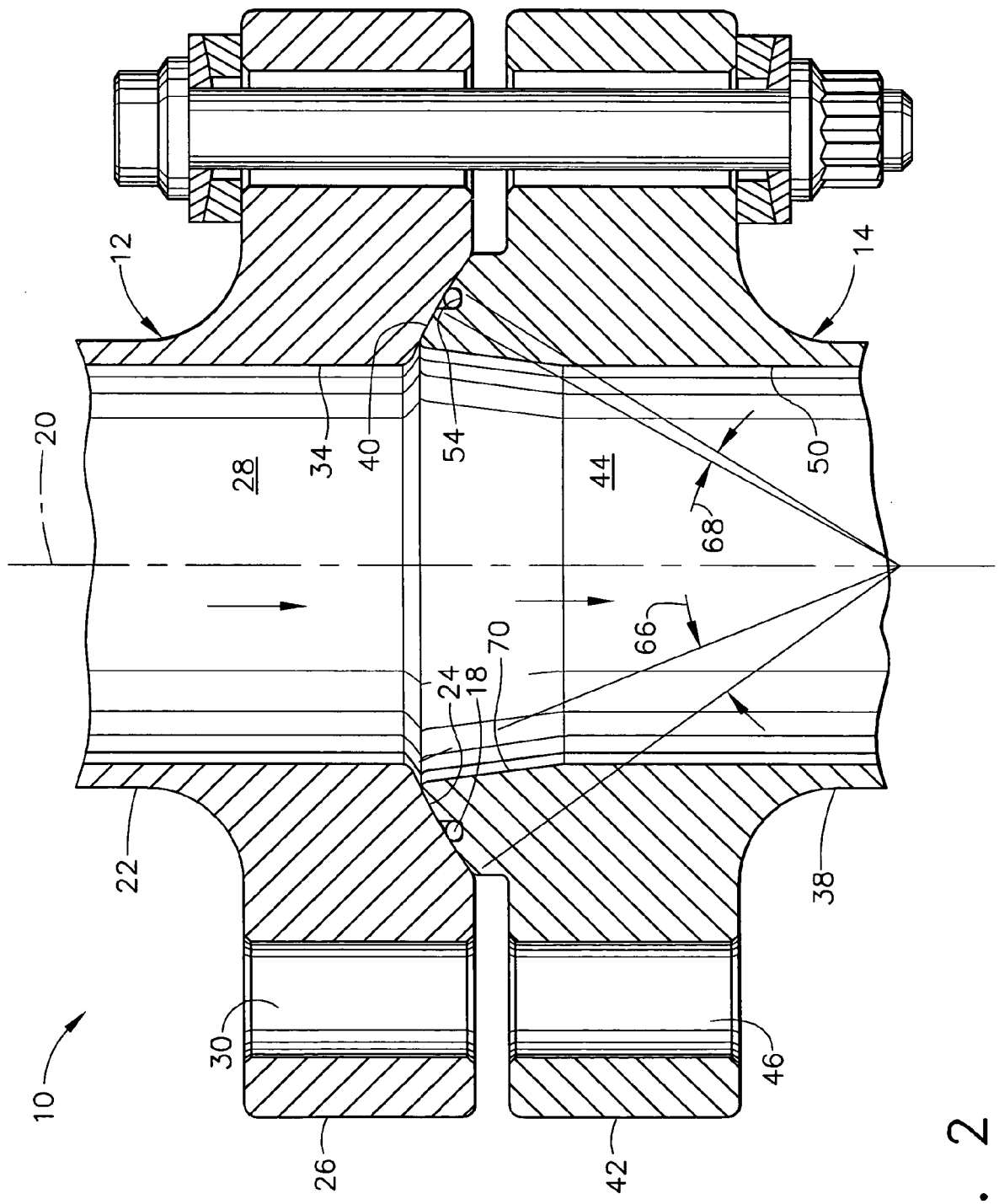
FIG. 2 illustrates a cross-sectional view of the spherical flange interface assembly of FIG. 1.
Figure 3:
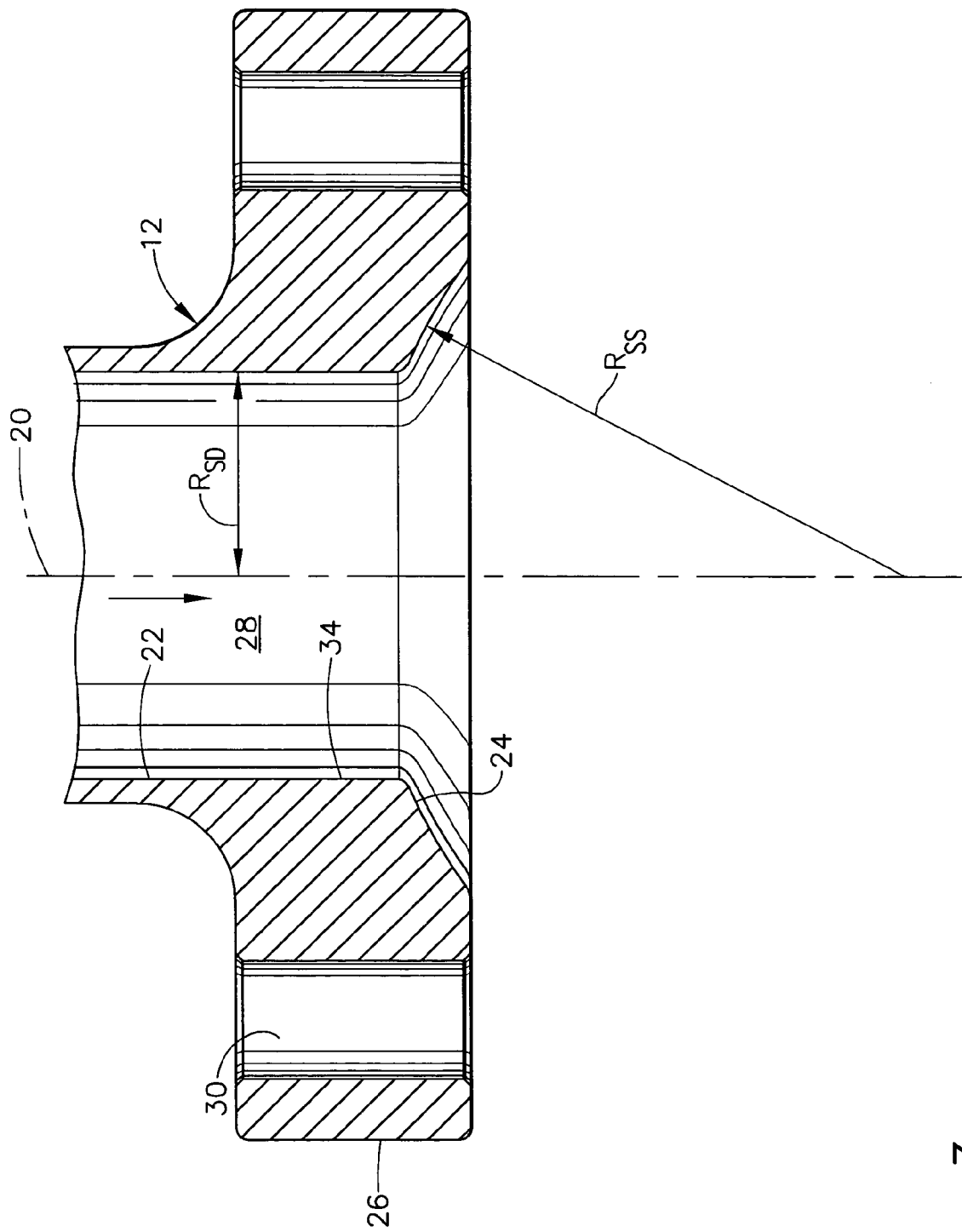
FIG. 3 illustrates a cross-sectional view of the seat member of the spherical flange assembly of FIG. 1.
Figure 4:
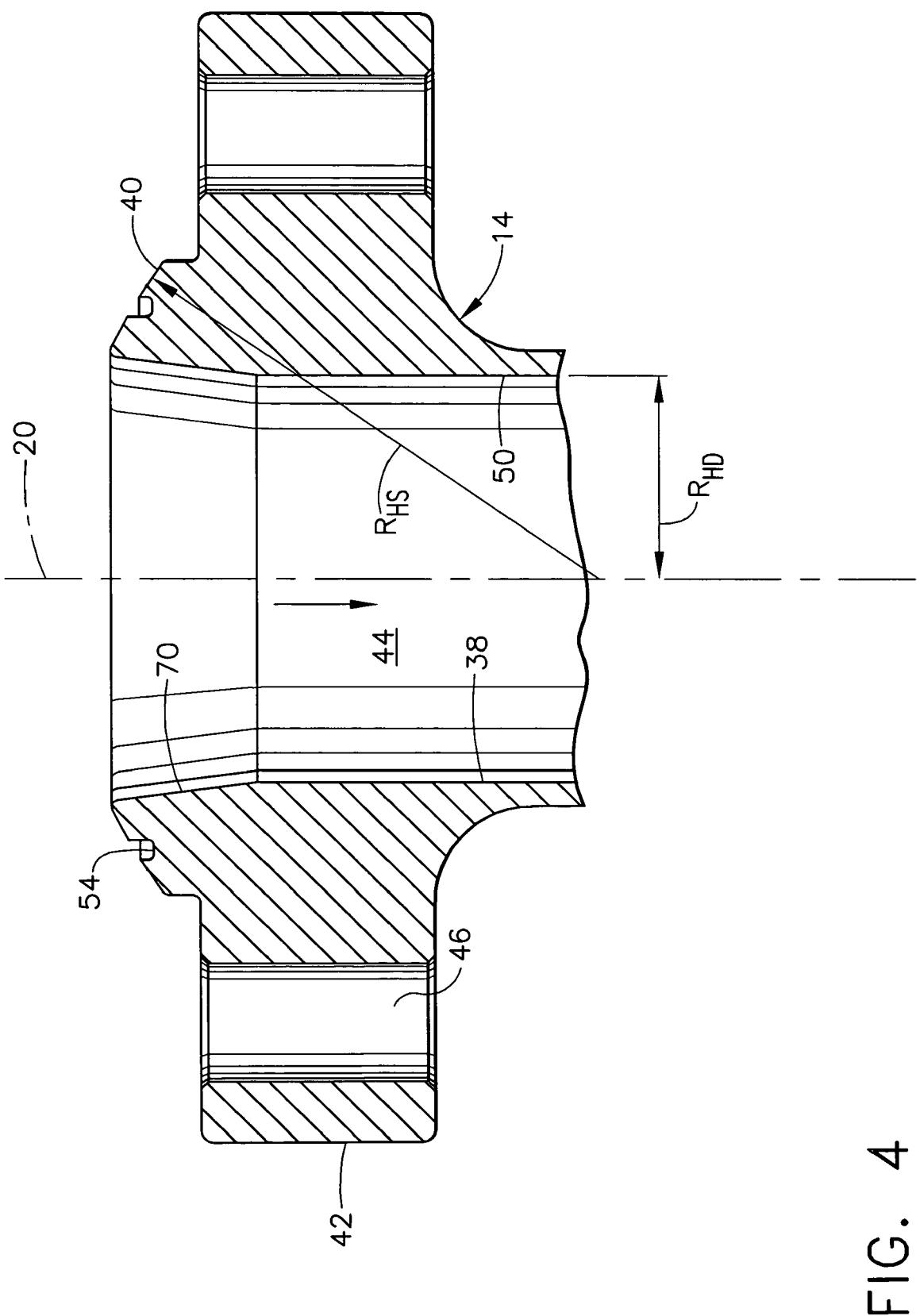
FIG. 4 illustrates a cross-sectional view of the heel member of the spherical flange assembly of FIG. 1.

As illustrated by FIG. 2, width 66, preferably specified in degrees, of convex heel interface 40 is preferably greater than width 68 of seal gland opening 54, also preferably specified in degrees, plus two times the degrees of a predetermined allowable misalignment. This is such that seal gland 18 will always be seated on the spherical surface of convex heel interface portion 40 when spherical flange assembly 10 is misaligned.

As illustrated in FIG. 1, and part of spherical flange assembly 10 is bolt assembly 16. As illustrated, bolt assembly 16 comprises bolt 56, bolt spherical washer 58, nut 60 and nut spherical washer 62. Each bolt assembly 16 are disposed within two of the plurality of openings 30, 46. In operation, when each bolt assembly 16 is installed within one of the plurality of openings 30, and a corresponding opening 46, bolt assembly 16 is tightened, thereby nesting heel member 14 into seat member 12. Each element of bolt assembly 16 comprises elements commonly known in the art, although it is preferred that each element comprises compatible strength materials to permit preloading spherical flange assembly 10 with sufficient preload to preclude separation at the nested interfaces of heel member 14 and seat member 12 at maximum operating conditions.

Further, each of the plurality of openings 30, 46 are configured in a manner to receive bolt 56 of bolt assembly 16. That is, each of the plurality of openings 30, 46 are of a diameter large enough to permit the prescribed angular misalignment without binding bolt 56 of bolt assembly 16. It is further preferred that the inside surfaces 32, 48 of each of the plurality of openings 30, 46, respectively, comprise a smooth, unthreaded surface to allow bolt 56 of bolt assembly 16 to pass through each of the plurality of openings 30, 46 and be retained by nut 60 of bolt assembly 16.

Figure 5:
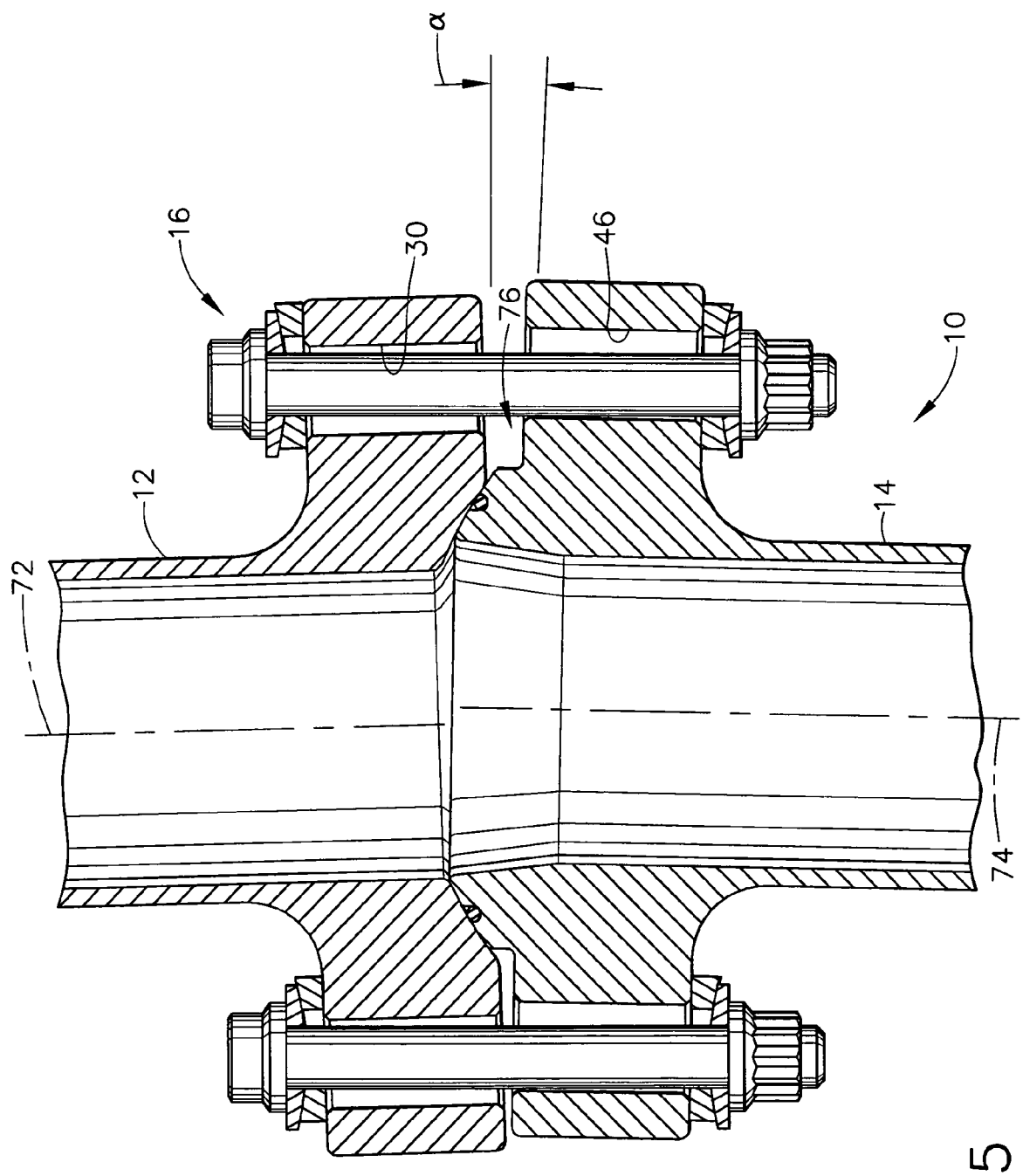
FIG. 5 illustrates an embodiment of the spherical flange interface assembly of FIG. 1, manufactured in accordance with the present invention and misaligned 2 degrees.

FIG. 5 illustrates spherical flange apparatus 10 in operation. Referring to FIG. 5, heel member 14 is illustrated as being misaligned from seat member 12. The axis of seat member 12 is illustrated as reference numeral 72, while the axis of heel member is shown as reference numeral 74. The angle of deflection between the seat member 12 and the heel member 14 is illustrated by $\alpha$. As can be seen from FIG. 5, although there is misalignment between seat member 12 and heel member 14, spherical flange assembly 10 does not cause leakage of any gas or liquid contained therewith. Also illustrated in FIG. 5 is an axial space 76. Axial space 76 is provided between seat member 12 and heel member 14 to permit a predetermined amount of angular misalignment by rotating on the nested spherical interface without bottoming on the flange faces. Also shown in FIG. 5 is the spacing between bolt assembly 106 and the plurality of openings 30, 46.

While specific embodiments of the present invention have been described in detail, it will be appreciated by those skilled in the art that various modifications and alternatives to those details could be developed in light of the overall teachings of the disclosure. Accordingly, it will be understood that the particular arrangements and procedures disclosed are meant to be illustrative only and not limiting as to the scope of the invention, which is to be given the full breadth of the appended claims and any equivalents thereof.

What is claimed is:

1. A spherical flange assembly, comprising:
   a seat member made from a high strength material and comprising a concave portion;

a heel member made from a high strength material and comprising a convex portion for mated association with the concave portion and a seal gland opening disposed along the convex portion;

a pressure assisted and axially preloaded seal disposed within the seal gland opening; and at least one nut and bolt assembly for rigidly and removably attaching the seat member to the heel member, wherein the spherical flange assembly is configured to permit a predetermined amount of angular misalignment between the seat member and the heel member without leakage across the seal, wherein the spherical radius of the concave portion of the seat member and the spherical radius of the convex portion of the heel member comprise equal lengths.

* * * * *